United States Patent [19]

Muselli

[11] Patent Number: 5,109,592

[45] Date of Patent: May 5, 1992

[54] MACHINE TOOL

[75] Inventor: Roberto Muselli, Piacenza, Italy

[73] Assignee: JOBS S.p.A., Piacenza, Italy

[21] Appl. No.: 714,210

[22] Filed: Jun. 12, 1991

Related U.S. Application Data

[62] Division of Ser. No. 528,828, May 24, 1990, Pat. No. 5,044,064.

[30] Foreign Application Priority Data

Sep. 11, 1989 [IT] Italy ................................ 44815 A/89

[51] Int. Cl.⁵ ............................................. B23Q 3/12
[52] U.S. Cl. ........................................ 483/4; 409/211; 901/41
[58] Field of Search ............... 29/568, 39, 36; 901/41, 901/30; 409/211, 201, 204, 216, 214, 206

[56] References Cited

U.S. PATENT DOCUMENTS 4,988,244  1/1991  Sheldon et al. ...................... 409/201

FOREIGN PATENT DOCUMENTS 1008511  5/1952  France ............................. 409/206
222809   9/1989  Japan .............................. 409/211
694697   7/1953  United Kingdom ............... 409/211

Primary Examiner—William Briggs
Attorney, Agent, or Firm—Notaro & Michalos

[57] ABSTRACT

Automatic machine tool head designed for the assembly of mechanical sub-assemblies such as aircraft, automobile and vessel structures, etc., comprising equipment used for rapid coupling and changeover of multi-task end effectors (MTEE), the equipment presenting a pair of Cartesian axes after two polar axes.

3 Claims, 9 Drawing Sheets

MACHINE TOOL

This application is a division of application No. 07/528,828, filed May 24, 1990 now Pat. No. 5,044,064.

FIELD AND BACKGROUND OF THE INVENTION

The invention relates to an automatic machine tool equipped with coupling devices which allow automatic replacement of end effectors so that a number of different tasks such as those involved in the assembly of aircraft panels can be performed in succession, the entire cycle of necessary jobs such as drilling, countersinking, glueing, rivet driving and hammering or pressing being performed in rapid success in, fully automatically, with no need to move the panel or the principal axes of the machine or both.

For the sake of clarity, the meaning of the technical terms used herein is set out below.

- END EFFECTOR (EE): single electrically/pneumatically/hydraulically operated mechanical unit (effector) designed to perform preset basic operations
- MULTITASK END EFFECTOR (MTEE): multiple interchangeable mechanical unit (effector) comprising one or more electrically/ pneumatically/hydraulically operated EE designed to perform preset operation sequences
- AIRCRAFT PANEL: fuselage and/or wing surface structure subassembly
- TWIST HEAD: bi-rotating operating head
- PIVOT POINT (PP): central pivoting point of the twist head
- TOOLING: all fixtures, rests and end effectors
- CNC: computerised numerical control
- FASTENERS: elements used to effect rigid assembly of different parts of mechanical sub-assemblies, comprising pop rivets, solid rivets, bolts, hi-lock rivets, lock-bolt rivets, LGP rivets, anchor nuts and temporary fastenings such as log bolts, blind rivets, etc.

During the assembly of aircraft structures, and in particular during panel assembly, considerable difficulties are encountered because various operations need to be performed to extremely fine tolerances on pieces which are difficult to position and maneuver, such as panels.

While the various components of the aircraft structure, and in particular the panels, constitute a unit resistant to considerable stresses once assembly is completed, they are extremely delicate and need to be handled with great care before assembly.

In view of the fact that the length and/or width of the panels is often between 5 and 12 meters while the thickness is only 2 or 3 millimeters, that they present a curved surface, and that the various assembly operations have to be performed to tolerances of a tenth of a millimeter, the difficulties encountered are evident. For example, in order to assemble the metal sheets with the ribs and spars constituting the framework of an aircraft, or join the panels thus obtained one to another, fasteners such as nails or rivets are used. In order to apply them a hole must be drilled, then countersinking is performed and operations on the hole surface such as pretensioning are carried out; where a necessary a layer of adhesive is applied, and finally the fastener is installed. All these operations must necessarily be performed with the greatest precision and speed.

For example, the tolerances required when driving some types of rivet must not exceed one or two hundredths of a millimeter as the rivet would otherwise be forced against the hole surface, damaging it and causing the panel to be scrapped.

Once hammered in the rivet must be flush with the outer edge of the panel, neither projecting nor receding, in order to comply with aerodynamic requirements.

In order to perform all these operations with the necessary precision manual technology is used, supported by highly complex, costly equipment including automatic dedicated machine tools fitted to specially made units.

These machines can be divided into two major categories—in the first case, the panel is fixed to mobile support structures to allow the machine to reach to fastener installation positions, while in the second, the machine moves and the panel does not. Both these systems present considerable limitations and drawbacks, however.

In the case of machines falling into the first category, the panels machined are secured to huge mobile supports.

Great difficulty is obviously encountered in making structures to which curved panels only a few millimeters thick with an area of 50-60 sq.m. can be secured; the panels must be positioned on the structure with great precision and secured to it in such as way as to prevent even the slightest relative movement during machining. The result is a very large, heavy, complex structure which is required to move to very fine positioning tolerances in order to bring the various parts of the panel to the tool as required. This system also presents the serious drawback of requiring very long machine stoppages whenever the tooling has to be replaced so that a different job can be performed, e.g. in order to change over from drilling to rivet driving.

For this purpose it is necessary to shut down the entire machine, change the tool holders, tools and fixtures manually, and then clear the machine, i.e. reset all references, mechanical and electronic zeros etc. before starting on a different job.

For this reason it is necessary to perform a given job on one panel, then remove it from the support and store it and proceed with the same job on the next panel.

When all panels are finished the machine is shut down, the necessary tools replaced and the panels repositioned one at a time on the support ready for the next task to be performed.

The limitations and drawbacks of the dedicated machines described above can be summarised as follows:
 a) very large mobile structures have to be constructed to perform controlled movements with fine tolerances
 b) units have to be shut down for long periods whenever a different job is performed and the tooling has to be changed
 c) the unit lacks flexibility because it is designed to do a given job and cannot be adapted for different operations
 d) it takes a long time to finish each piece
 e) a great deal of space is required to store a given number of panels between one operation and the next
 f) the use of the machine is limited in flexibility as the most complex operations cannot be performed, especially in the case of sharply curving parts, partly because of interference between the workpiece, its rest and the machine.

The machines in the second category, one of which is described in Italian patent application 44804 a/88, comprise a mobile arm whose length is equal to three perpendicular axes, at the end of which is fitted a twist head with one or two degrees of freedom; this head can rotate around polar axes which thus constitute the last axes of the unit.

The end effector is fitted on the twist head; the effector may, for example, be represented by an electric chuck with corresponding automatically interchangeable tool.

While this type of apparatus can be adapted to perform different jobs more easily than the first type, it does not wholly solve the problems described above.

Although the panel remains fixed during machining, replacement of the end effectors is highly laborious and their structure is complex, as they must be equipped with various effectors for the positioning sequences of the individual units.

In addition, the constraints due to the geometry of the head cause problems with automatic fastener feed connection, and require excessive lengths at the expense of precise positioning. This obviously means greater difficulty in repositioning the tool on the workpiece while remaining within the required tolerances.

There is consequently a strongly-felt need for a machine which automatically performs a succession of different tasks and features simplified replacement of the end effectors without shutting down the machine or moving the workpiece.

SUMMARY OF THE INVENTION

For this purpose, this invention proposes a machine tool with automatic replacement of end effectors, of the type comprising a mobile arm whose length is equal to three Cartesian axes, with an operating head fitted to the end of it which moves alone a pair of polar axes, a plate equipped with rapid coupling systems for one or more end effectors being fitted to the said operating head, the said plate being mobile in relation to the said head and a pair of Cartesian axes long.

The resulting machine has a total of 7 degrees of freedom and the last axes in it are constituted by a pair of Cartesian axes.

BRIEF DESCRIPTION OF THE DRAWINGS

This invention will now be described in detail, by way of example but not of limitation, with special reference to the annexed figures in which.

DESCRIPTION OF THE PREFERRED EMBODIMENT

Figure 1:
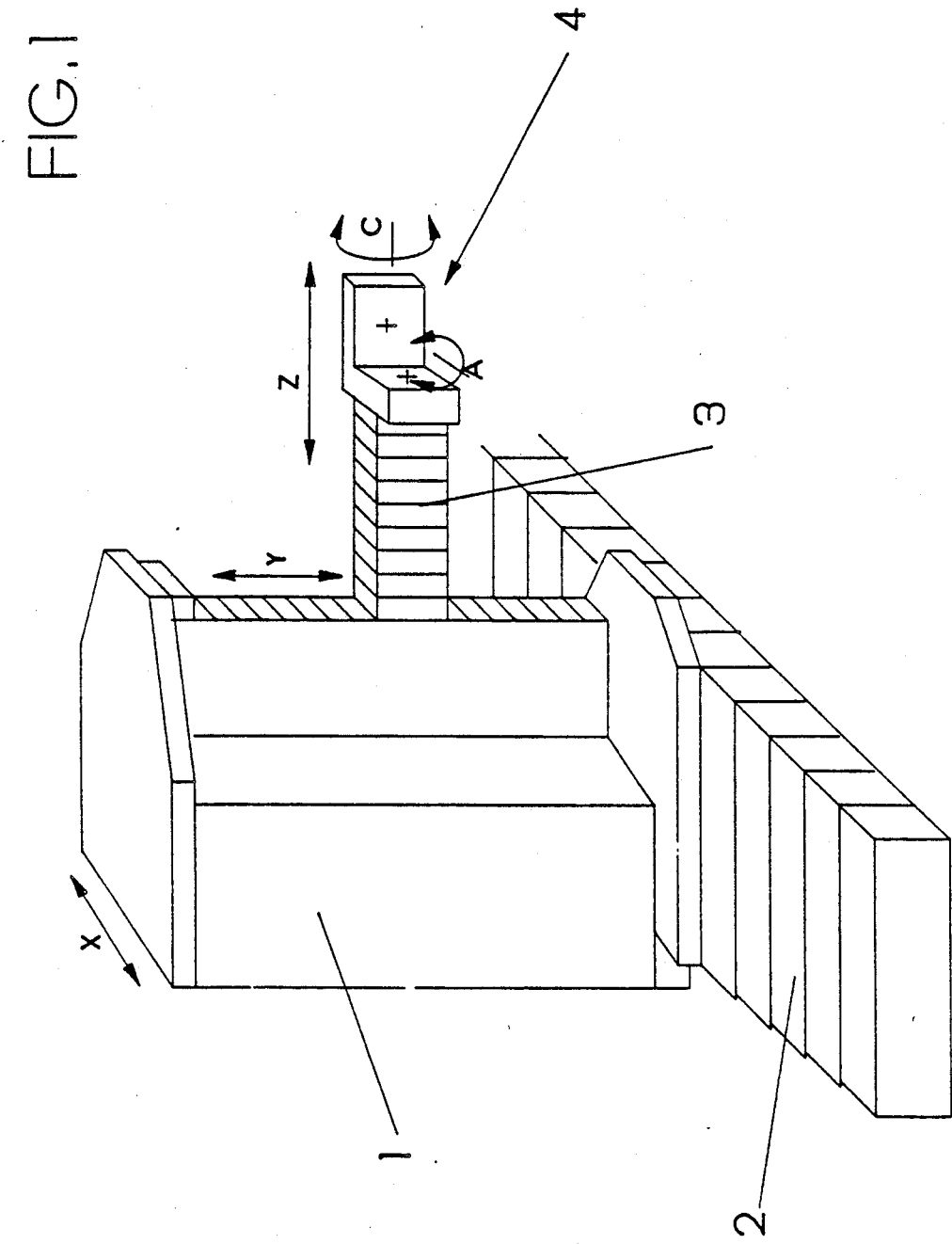
FIG. 1 shows a view of the machine according to the invention.

A machine in accordance with the innovation comprises (FIG. 1) a support 1 which moves along a base 2 in the direction of axis x, to which support is fitted an arm 3 which moves along axes y and z which, together with axis x, constitute a set of three Cartesian axes.

At the end of arm 3 is fitted an operating head assembly marked 4; the operating head has two degrees of freedom defined by rotation axes A and C.

A plate with rapid couplings for the end effectors is fitted to head 4; this plate runs along a paid of guides perpendicular to one another so as to define a further paid of cartesian axes W and V, after rotational axes A and C.

Figure 2:
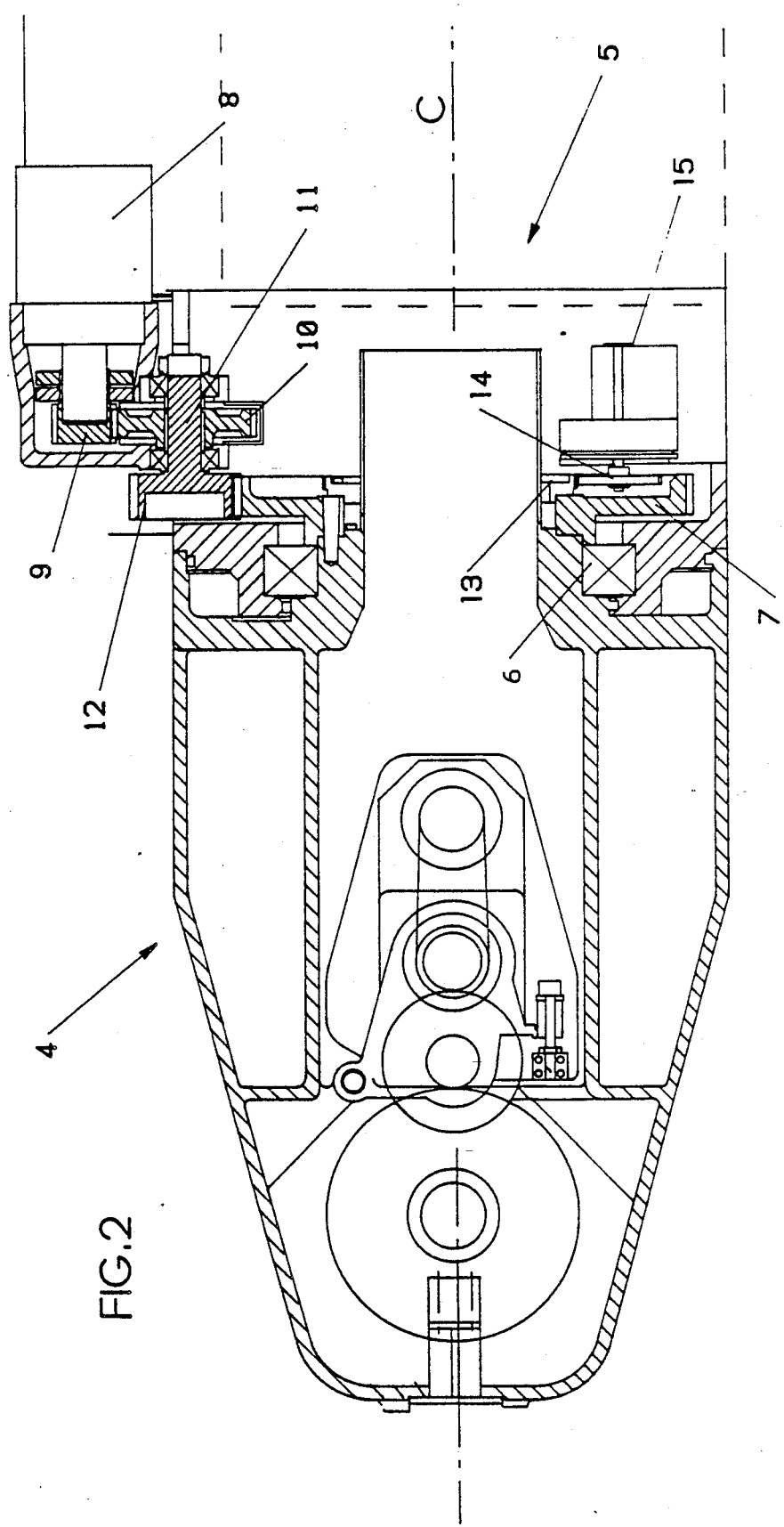
FIG. 2 shows a side view in partial cross-section of the operating head of a machine according to the invention.
Figure 3:
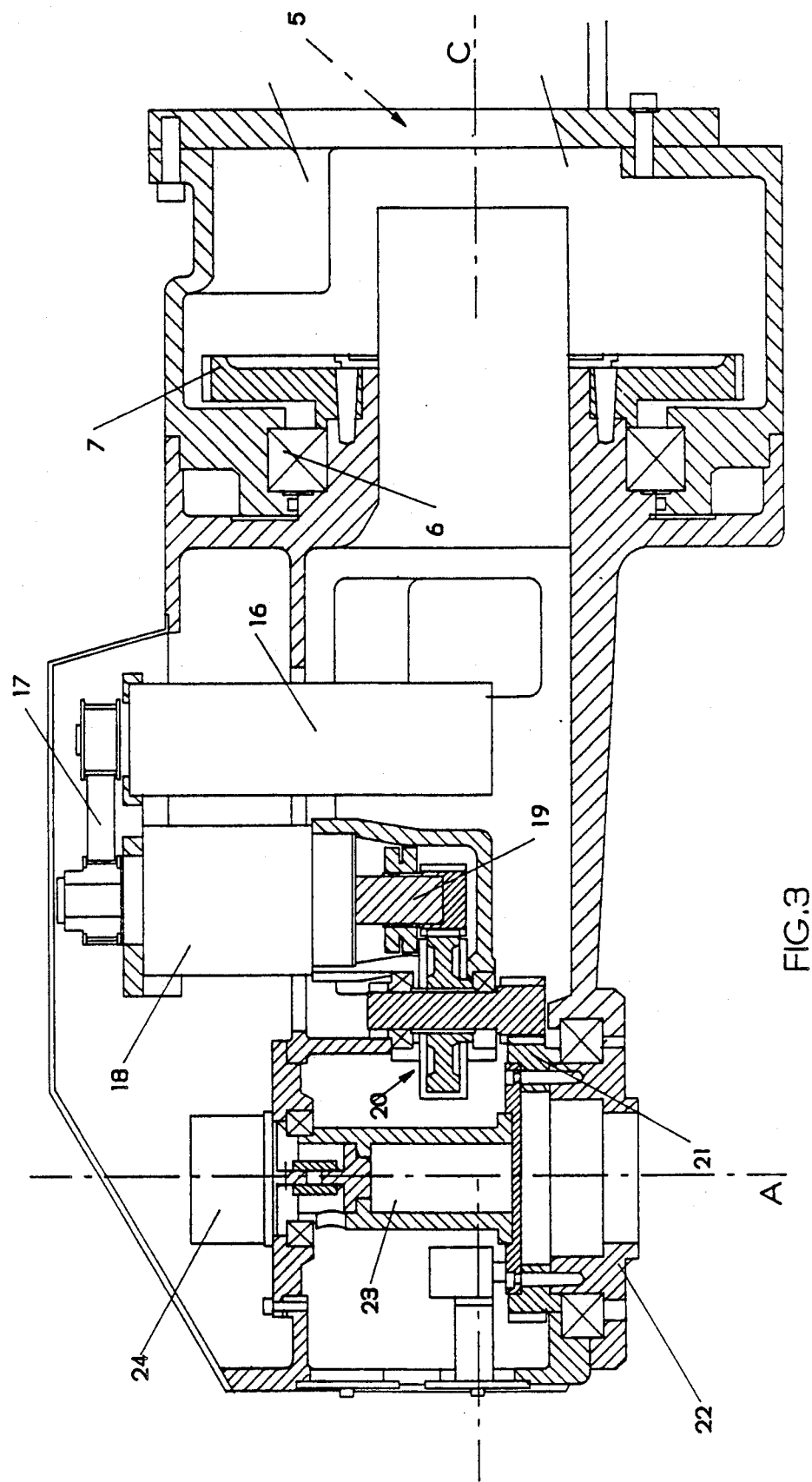
FIG. 3 shows a cross-section of the head illustrated in FIG. 2.

In FIGS. 2 and 3, no. 5 indicates the end of the arm to which head 4 is fitted.

The head rotates around axis C of the arm while the end effector support plate rotates around axis A, which is perpendicular to axis C.

This structure of head 4 is fitted to the arm with a thrust bearing 6, and a helical gear 7 is fitted to it (FIG. 3).

A brushless DC motor 8 fitted to arm end 5 has a pinion 9 which engages with cogwheel 10 fitted on a shaft 11; a second cogwheel 12 which in turn engages with helical gear 7 is splined to shaft 11 (FIG. 2).

This assembly constitutes the motor reducer system which controls the rotation of head 4 around axis C.

In order to measure the rotations of this structure around axis C directly and precisely, a crown wheel 13 integral with head 4 is fitted; this engages with a cogwheel 14 of a transducer 15 which may be an encoder or a resolver, for example, depending on the type of electronics used for the machine.

Inside head 4, which has an L-shaped structure, there is a DC motor 16 (FIG. 3) connected via belt 17 to a reducer 18 whose pinion 19 engages with a reduction gear 20 of known type; this gear in turn engages a cogwheel 21 integral with a support flange 22, fitted to head 4 on combined crossed roller bearings, which can rotate around axis A (FIG. 3).

In order to detect even the slightest movements of axis A precisely, a support 23 which carries a high-resolution encoder 24 in axis is fitted to flange 22.

A carriage 53 which runs along a pair of recirculating ball guides 54 is fitted to flange 22 (FIGS. 4 and 5); this carriage is operated by a screw 25 moved, via a belt 26, by a brushless motor 55.

A similar carriage 27 is fitted to carriage 53 (FIG. 6); the former runs along guides 28, perpendicular to guides 54, moved by a screw 29 which is connected via a belt 30 to a motor 31.

Carriage 27 is fitted with a set of mechanical, electrical, hydraulic and pneumatic couplings which house the end effector support structure and connect the electrical and pneumatic power supply to the effectors.

Figure 6:
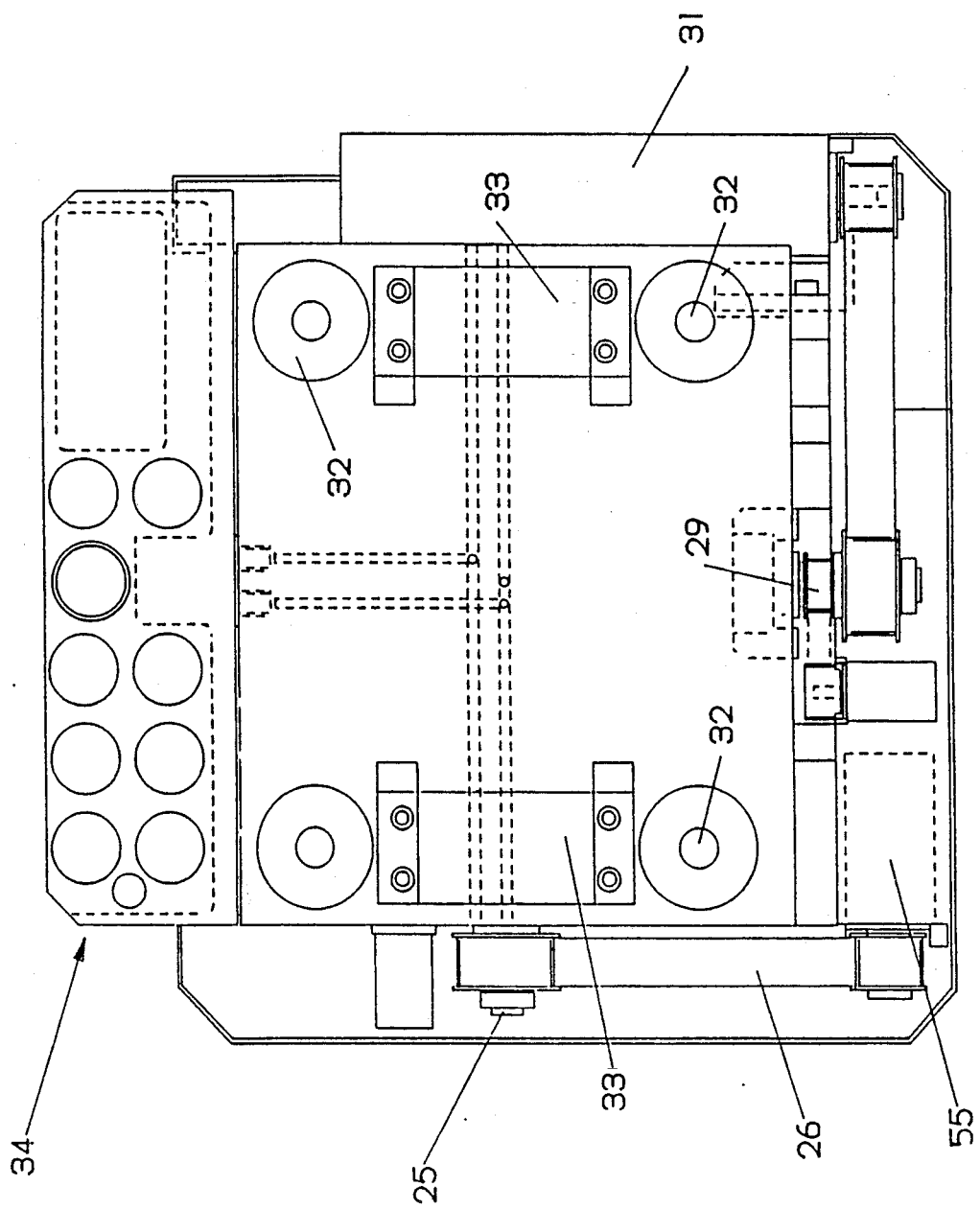
FIG. 6 shows a view of the end effector coupling plate.
Figure 7:
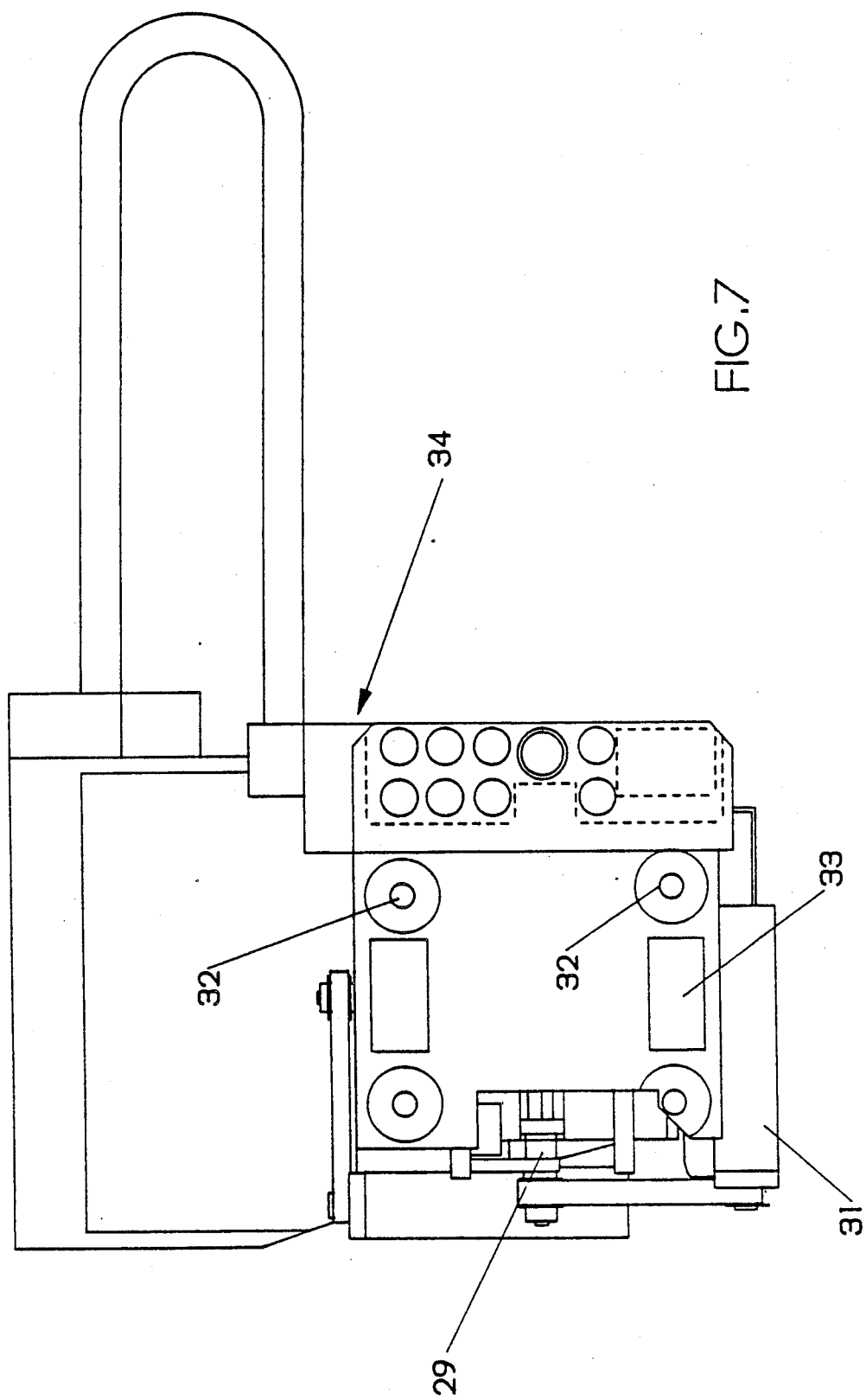
FIGS. 7 and 8 show two views of the operating head according to a pair of perpendicular axes and FIG. 9 shows a perspective view of the operating head.
Figure 8:
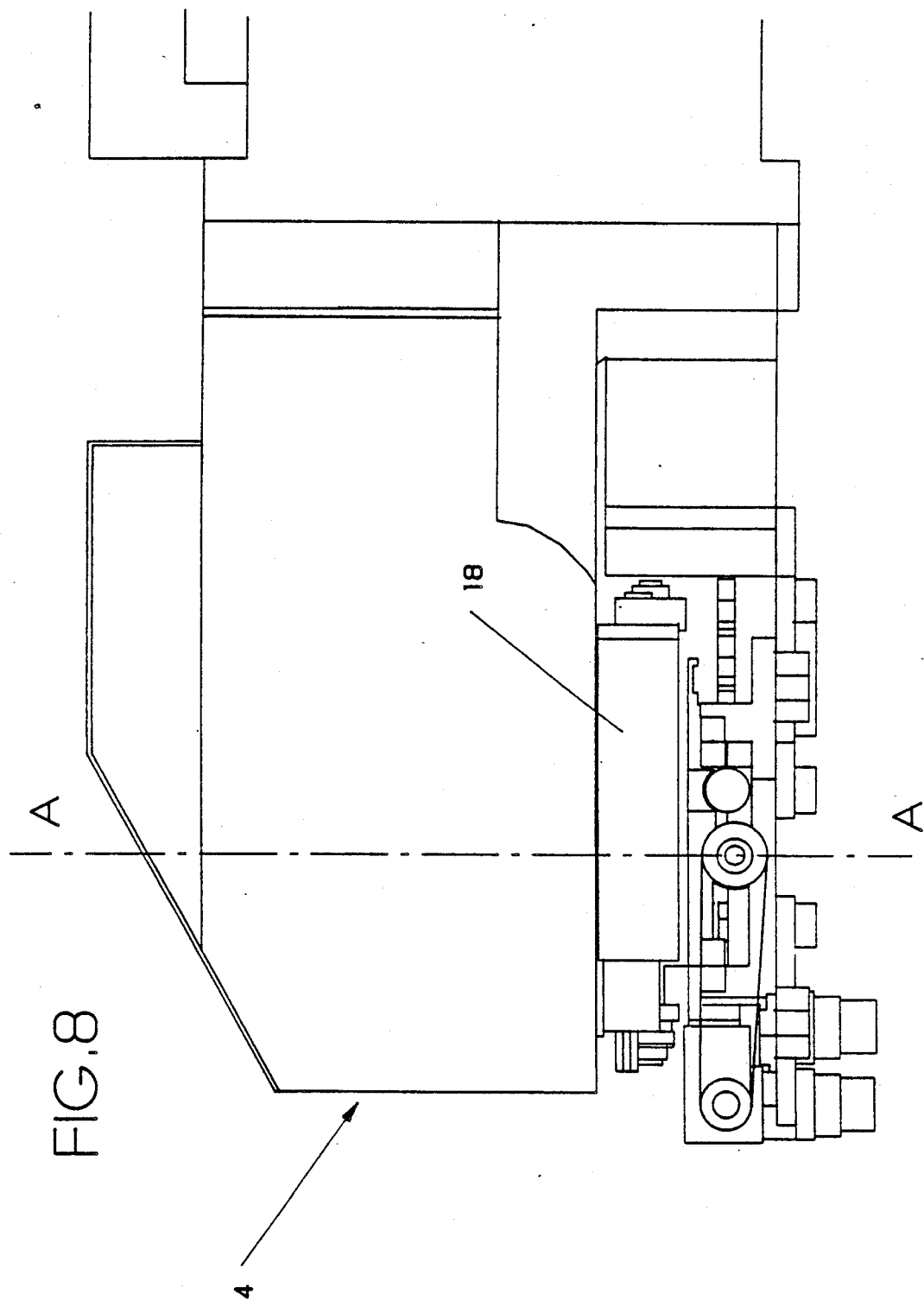
Figure 9:
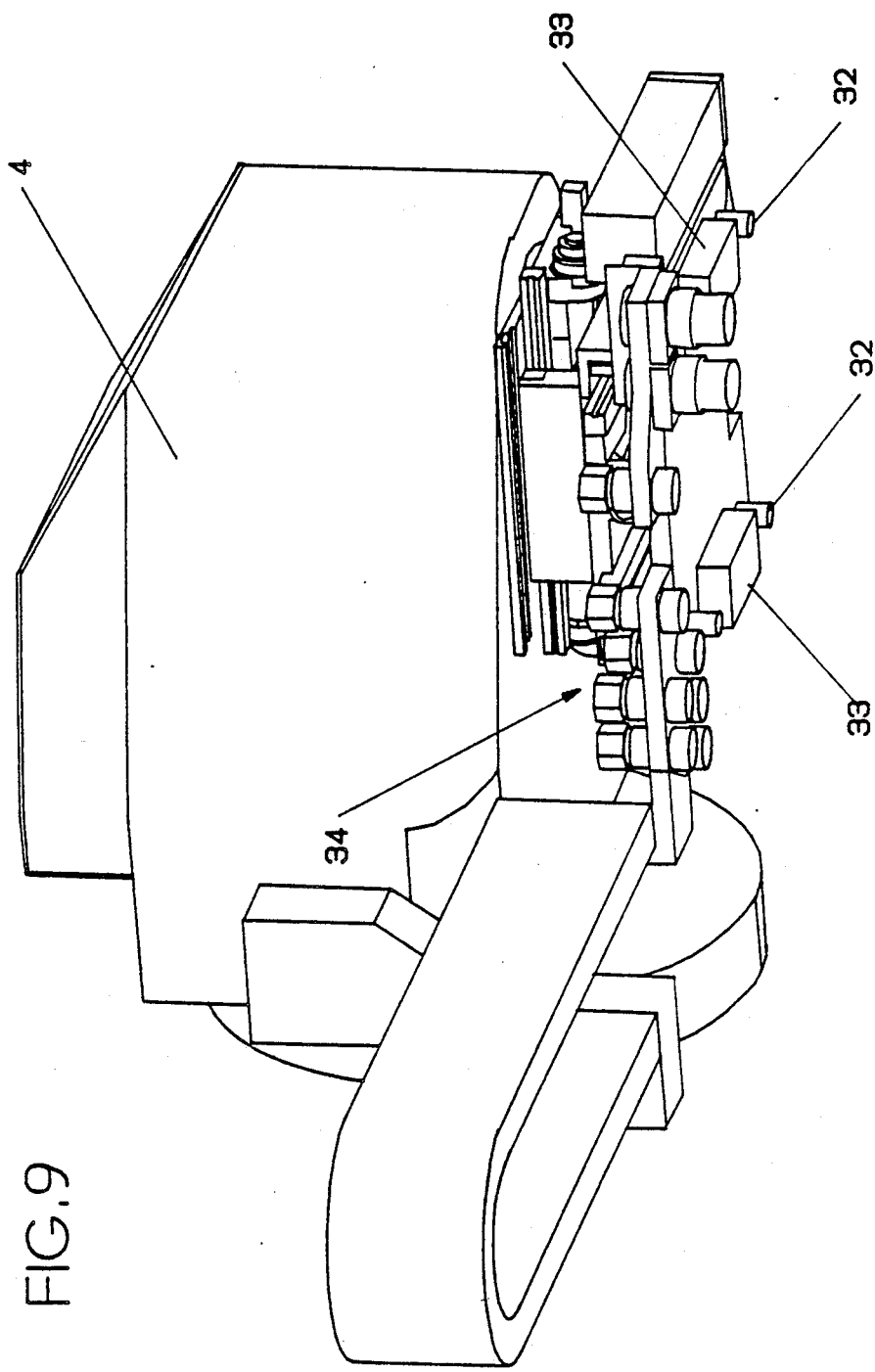

A plan of carriage 27, which thus constitutes the end effector coupling plate, is shown in FIG. 6; this carriage is fitted with four pins 32, two pairs of hydraulic bolts or facing pistons 33 and a hydraulic, pneumatic, electrical etc. power supply coupling unit 34.

Carriage 53 moves along axis W of the machine parallel to the axis of screw 25, while carriage 27 moves in accordance with axis V, parallel to the axis of screw 29.

The advantage of having two linear axes last lies in the fact that this system:

simplifies the end effectors, many of which would otherwise have to contain the axes which in this configuration are on the machine means that no positioning problems arise when end effectors are constructed with tools having different centre distances offers two numerical control movements instead of the pneumatic or hydraulic on/off movements used in known machines features programmable advance of the workpiece all of which characteristics provide the ideal technological operating conditions.

Support 35 of a pressure bar is fixed to flange 22 (FIG. 4), linked to the movements of axis A and independent of the movements of axes V and W.

Figure 4:
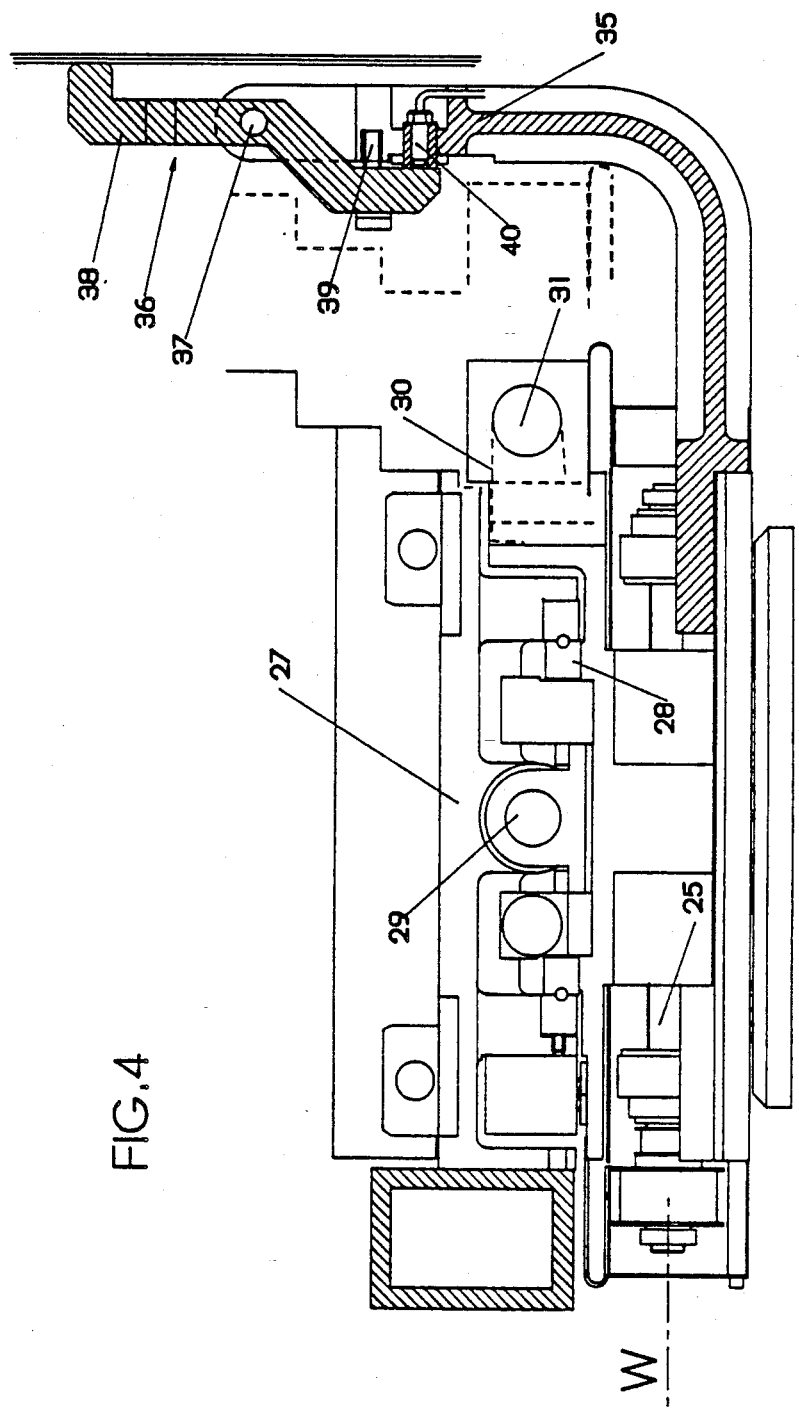
FIGS. 4 and 5 show the side view and cross-section according to perpendicular planes of the ned effector support plate in the head illustrated in FIG. 2.
Figure 5:
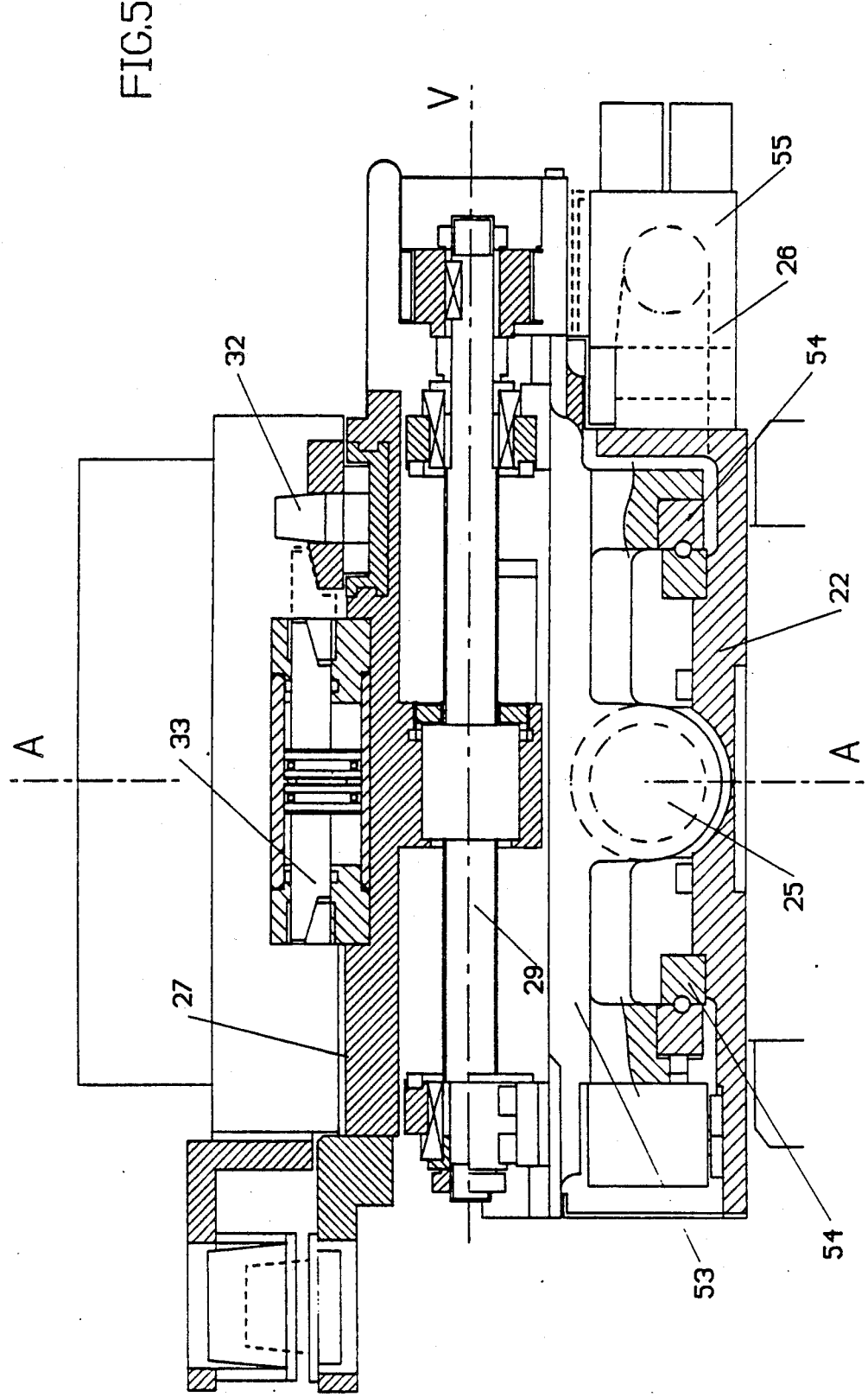

The pressure bar basically consists of an interchangeable lever 36 hinged at 37 to the structure; it presents one arm 38 shaped so as to press on the metal sheets allowing the passage of the tool, while the other arm is subject to the action of a spring and/or a pneumatic cylinder 39 which tends to rotate it clockwise as shown in FIG. 4.

Lever 36, when turned anticlockwise, operates a microswitch 40 connected to devices which control all the movements of the machine.

The movements of the machine along axes V and W are controlled by a pair of resolvers of known type.

For the purpose of use, it is first necessary to set up the end effectors, which can be freely selected from those commercially available; they are fitted to the corresponding supports equipped with standard couplings to the plate of carriage 27.

The end effector supports each comprise one or more sliding plates to which end the end effector is fixed; the plate is advanced or retracted along the support by pneumatic systems until each end effector reaches a fixed stop plate integral with the support.

The end effector supports are equipped with connections designed for rapid coupling to plate 27 with no need for any manual operation.

These systems, like the pneumatic devices which advance each end effector in relation to its support, are not described in detail as they are of known type.

However, it should be noted that the special L-shaped structure of the head means that the unit does not need to be fitted with a particular type of end effector; any type and above all any length can be used without affecting the end result.

In fact, it is possible to fit all the end effectors so that the tip of the tool is equidistant from the pivot point. This is impossible with twist heads of known type, as the end effector is fitted inside a bracket which means that its rear dimensions must be limited in order to comply with the required tolerances.

The fact that all tools can be fitted in alignment, so that when they are brought into axis with the workpiece their tips are at the same distance from the pivot point, means that the same positioning precision can be obtained with all tools, regardless of their dimensions.

In practice, end effectors of any size can be used regardless of length, provided that they are preset in accordance with the appropriate length and that the end of the tool is brought alongside the arm.

When the end effector support has been prepared, the machine is ready for automatic operation; the operating head is moved to the support for automatic coupling and is then brought into axis with and perpendicular to the point to be worked on.

The machine is positioned so as to bring part 38 of the pressure bar against the panel to be assembled; the advance continues until lever 36, counteracting the force exerted by spring 39, operates microswitch 40.

Lever 36 has a hole at its upper end shown in FIG. 4, through which a tool on the end of the effector mounted to a carriage 27 passes.

If necessary, a suitable stop plate relating to the operations performed on the opposite side of the panel can be fitted on the other side, or it might be useful to add a similar machine equipped with one or more multi-task end effectors designed for synchronised performance of operations complementary to the first. (Alternatively, the complementary operations could be performed semi-automatically by an operator equipped with conventional tools.)

When the end effector support has been coupled, the machine control devices pneumatically advance the first effector until it meets the fixed stop plate of its support; plate 53 then advances along axis W, performing the required task and controlling the movements of the end effector with the required precision by CNC. At the end of this first stage the end effector retracts, after which the machine activates motor 31 to control the traverse of carriage 27 along axis V until the second end effector is perpendicular to the workpiece; the effector is then pushed against the fixed stop plate.

Motor 55 is again activated; by means of screw 25 it advances carriage 53 along axis W to perform the second job on the panel, and so on.

At the end of the entire series of operations performed on the panel with the multi-task end effector dedicated to a given type of fastener, the machine moves to place that effector on the end effector support and picks up a different one, suitable for another type of fastener, which is automatically coupled to plate or carriage 27 and secured by hydraulic bolts 33.

As the plate is equipped with rapid coupling devices for a support to which one or more end effectors with corresponding tools are fitted, once the head has been brought into axis with the point to be worked on, the tool can be advanced by moving the plate along axis W; when the tool again retracts the plate can be moved along axis V to bring the second tool perpendicular to the point to be worked on and so forth, until the entire series of operations required on that point has been performed, without moving the principal axes (X, Y, Z, A and C) of the machine.

To change over to a different type of job, it is sufficient to replace the plate with another one fitted with the necessary end effectors; this operation can be performed automatically by the machine.

Every support with one or more end effectors is therefore described as multi-task because it is capable of performing an entire logical sequence of operations designed to instal a type of fastener permanently.

The necessary multi-task end effectors can therefore be picked up automatically and moved to perform the jobs required. The fact that there is a plate fitted with several end effectors means that once the machine has been positioned, the cycle of operations can be performed without moving the principal axes, involving evident advantages in terms of time saving and precision.

The L shape of head 4 has proved particularly advantageous as it enables most commercially available tools to be used, including manual types, of any size and shape.

Moreover, tool length is unimportant as the tools are fitted to one side of the head without other encumbrances; this means that they can all be positioned so that they have the same point of rotation which is as close a possible to the panel, producing fewer departures from the required position.

I claim:

1. A method for performing multiple operations on a workpiece by utilizing a machine comprising: a support movable on three Cartesian axes (X, Y, Z); an operating head mounted on said support and movable around two orthogonal axes (A, C); an interface plate mounted on said head, and adapted for receiving a support plate of a series of end effectors, said support plate being movable, by numeric control, on two orthogonal axes (V, W), said method comprising the steps of:

(a) positioning the operating head at a location where the operations are to be performed;

(b) moving by numeric control, said support plate along a first one of the orthongonal axes (V) so as to bring a first end effector into a co-axial alignment with the location where the multiple operations are to be performed;

(c) advancing the end effector against a fixed stop means which is integral with said support plate;

(d) advancing, by numerical control, said support plate along a second one of the orthogonal axes (W) to perform a first operation;

(e) retracting said support plate and said end effector;

(f) moving by numerical control, said support plate along said first axis (V) so as to bring a second end effector into co-axial alignment with the location where the multiple operations are to be performed;

(g) repeating steps (c) to (f) until all the operations are performed; and (h) exchanging the support plate with another support plate having a different series of end effectors, to repeat a cycle for performing a different series of operations.

2. The method of claim 1, wherein movements of step (c) are performed pneumatically.

3. The method of claim 1, wherein said head comprises pressure means (38) for exerting a controlled clamping pressure on a piece to be worked on.

* * * * *